(12) United States Patent
Reed et al.

(10) Patent No.: US 11,577,790 B2
(45) Date of Patent: Feb. 14, 2023

(54) STORAGE ASSEMBLY FOR A HEADACHE RACK

(71) Applicants: Roland Reed, Leander, TX (US); Justin Davis, Leander, TX (US)

(72) Inventors: Roland Reed, Leander, TX (US); Justin Davis, Leander, TX (US)

( * ) Notice: Subject to any disclaimer, the term of this patent is extended or adjusted under 35 U.S.C. 154(b) by 0 days.

(21) Appl. No.: 17/194,265

(22) Filed: Mar. 7, 2021

(65) Prior Publication Data
US 2022/0281534 A1 Sep. 8, 2022

(51) Int. Cl.
*B60R 9/06* (2006.01)
*B62D 33/02* (2006.01)

(52) U.S. Cl.
CPC ............ *B62D 33/0207* (2013.01); *B60R 9/06* (2013.01)

(58) Field of Classification Search
USPC ........................................................ 224/404
See application file for complete search history.

(56) References Cited

U.S. PATENT DOCUMENTS

| | | | | |
|---|---|---|---|---|
| 3,047,161 A * | 7/1962 | Thacker | ..................... | B60P 1/54 212/175 |
| 4,732,420 A * | 3/1988 | O'Neil | ................... | B62D 33/02 296/37.6 |
| 7,926,831 B2 * | 4/2011 | Blair | ..................... | B62D 33/02 280/418.1 |
| 8,657,324 B2 * | 2/2014 | Waldner | .............. | B60R 16/0215 280/421 |
| 8,757,458 B2 * | 6/2014 | Nebel | ....................... | B60R 9/00 224/42.32 |
| 8,973,766 B2 * | 3/2015 | Sprang, Jr. | ............ | B60P 7/0823 211/70.6 |
| 10,202,063 B1 * | 2/2019 | Gist | ...................... | B60P 7/0846 |
| 2005/0093320 A1 * | 5/2005 | Brauer | .............. | B62D 33/0207 296/3 |
| 2011/0037286 A1 * | 2/2011 | Nebel | ....................... | B60R 9/00 384/19 |
| 2013/0292348 A1 * | 11/2013 | Sprang, Jr. | ............ | B60P 7/0823 211/49.1 |
| 2015/0151692 A1 * | 6/2015 | Sprang, Jr. | ............ | B60P 7/0823 211/70.6 |
| 2015/0197202 A1 * | 7/2015 | Harrison | ................ | B62D 33/02 296/3 |
| 2018/0118148 A1 * | 5/2018 | Parzyck | .................. | B60R 21/02 |

* cited by examiner

*Primary Examiner* — Peter N Helvey
(74) *Attorney, Agent, or Firm* — The Iwashko Law Firm, PLLC; Lev Ivan Gabriel Iwashko

(57) ABSTRACT

A storage assembly, including a headache rack to removably connect to a vehicle, at least one storage container removably connected to at least a portion of the headache rack to store at least one first item therein, and a plurality of mounting assemblies, each of the plurality of mounting assemblies including a support beam removably connected to at least a portion of a rear portion of the headache rack, a mounting beam perpendicularly disposed away from the support beam with respect to a first direction to connect to the vehicle, and a stabilizing beam angularly disposed away from the mounting beam toward the support beam with respect to a second direction different from the first direction to prevent the support beam and the headache rack from moving.

5 Claims, 5 Drawing Sheets

STORAGE ASSEMBLY FOR A HEADACHE RACK

BACKGROUND

1. Field

The present general inventive concept relates generally to a storage assembly, and particularly, to a storage assembly for a headache rack.

2. Description of the Related Art

Many professionals in construction and/or electrical work require a vast amount of hardware tools to perform their assignments. The worker who travels in a semi-trailer truck often resorts to carrying the hardware tools in a cab of the semi-trailer truck. Unsurprisingly, the cab has minimal space and/or means to organize the hardware tools. As such, management of the hardware tools is challenging as the hardware tools frequently get cluttered.

Additionally, while working, the worker will have to retrieve the hardware tools from the cab, which further complicates fast access to needed equipment. A headache rack is used to prevent injury to the worker in the semi-trailer truck. In general, the headache rack is created through welding to make it more stable and durable. In other words, the usual headache rack has no separable and/or detachable components. Some well known manufacturers of the usual headache rack include Merritt, Aero Industries, and East Manufacturing, all of which only produce headache racks that are welded.

Therefore, there is a need for a storage assembly for a headache rack that provides quicker access to the hardware tools.

SUMMARY

The present general inventive concept provides a storage assembly for a headache rack.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a storage assembly, including a headache rack to removably connect to a vehicle, at least one storage container removably connected to at least a portion of the headache rack to store at least one first item therein, and a plurality of mounting assemblies, each of the plurality of mounting assemblies including a support beam removably connected to at least a portion of a rear portion of the headache rack, a mounting beam perpendicularly disposed away from the support beam with respect to a first direction to connect to the vehicle, and a stabilizing beam angularly disposed away from the mounting beam toward the support beam with respect to a second direction different from the first direction to prevent the support beam and the headache rack from moving.

The support beam may extend below a bottom edge of the headache rack.

The storage assembly may further include a plurality of chain containers, each of the plurality of chain containers including a secondary body removably connected to at least a portion of the headache rack to store at least one second item therein, a plurality of protrusions perpendicularly disposed away from the secondary body with respect to a lateral direction to receive the at least one second item between the plurality of protrusions, and a cover may be movably disposed on at least a portion of the secondary body to cover an interior of the secondary body and the plurality of protrusions, such that the plurality of protrusions allow the at least one second item to move therebetween while the cover is closed.

The storage assembly may further include a plurality of storage bins removably connected to at least a portion of the headache rack to store at least one third item therein, such that a first of the plurality of the storage bins is removably connected to a first side of the at least one storage container, and a second of the plurality of storage bins is removably connected to a second side of the at least one storage container.

The storage assembly may further include a tarp holder removably connected to at least a portion of a top portion of the headache rack to store a tarp thereon.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
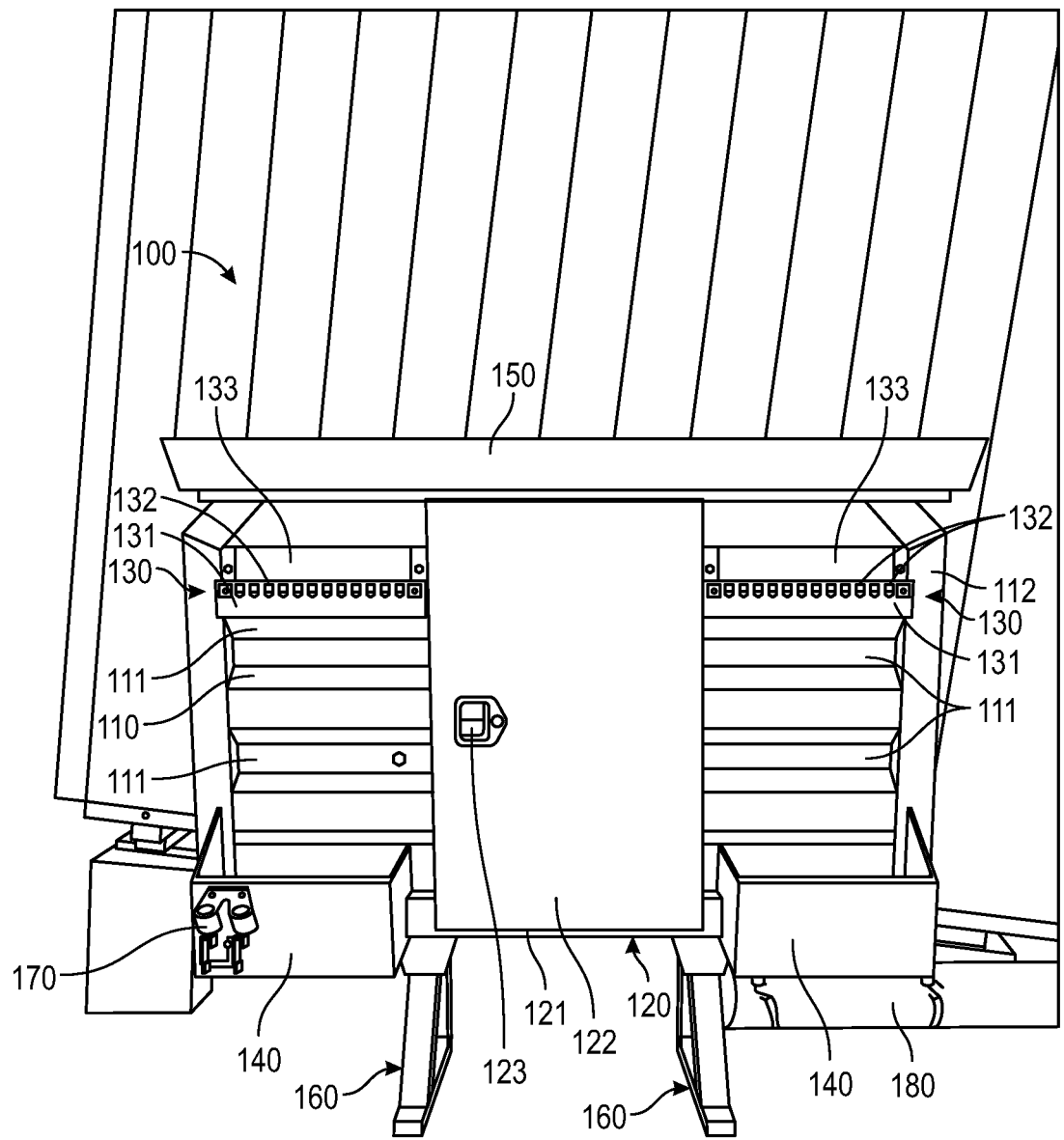
FIG. 1A illustrates a front perspective view of a storage assembly for a headache rack, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENT

Storage Assembly 100
Headache Rack 110
Recessed Surfaces 111
Outer Frame 112
Mounting Apertures 113
Storage Container 120
Container Body 121
Container Barrier 122
Latch 123
Shelves 124
Chain Containers 130
Secondary Body 131
Protrusions 132
Cover 133
Storage Bins 140
Tarp Holder 150
Mounting Assemblies 160
Support Beam 161
Mounting Beam 162
Stabilizing Beam 163
Auxiliary Beam 164
Tool Holder 170
Rod Holder 180
Support Panel 190

FIG. 1A illustrates a front perspective view of a storage assembly 100 for a headache rack 110, according to an exemplary embodiment of the present general inventive concept.

Figure 1B:
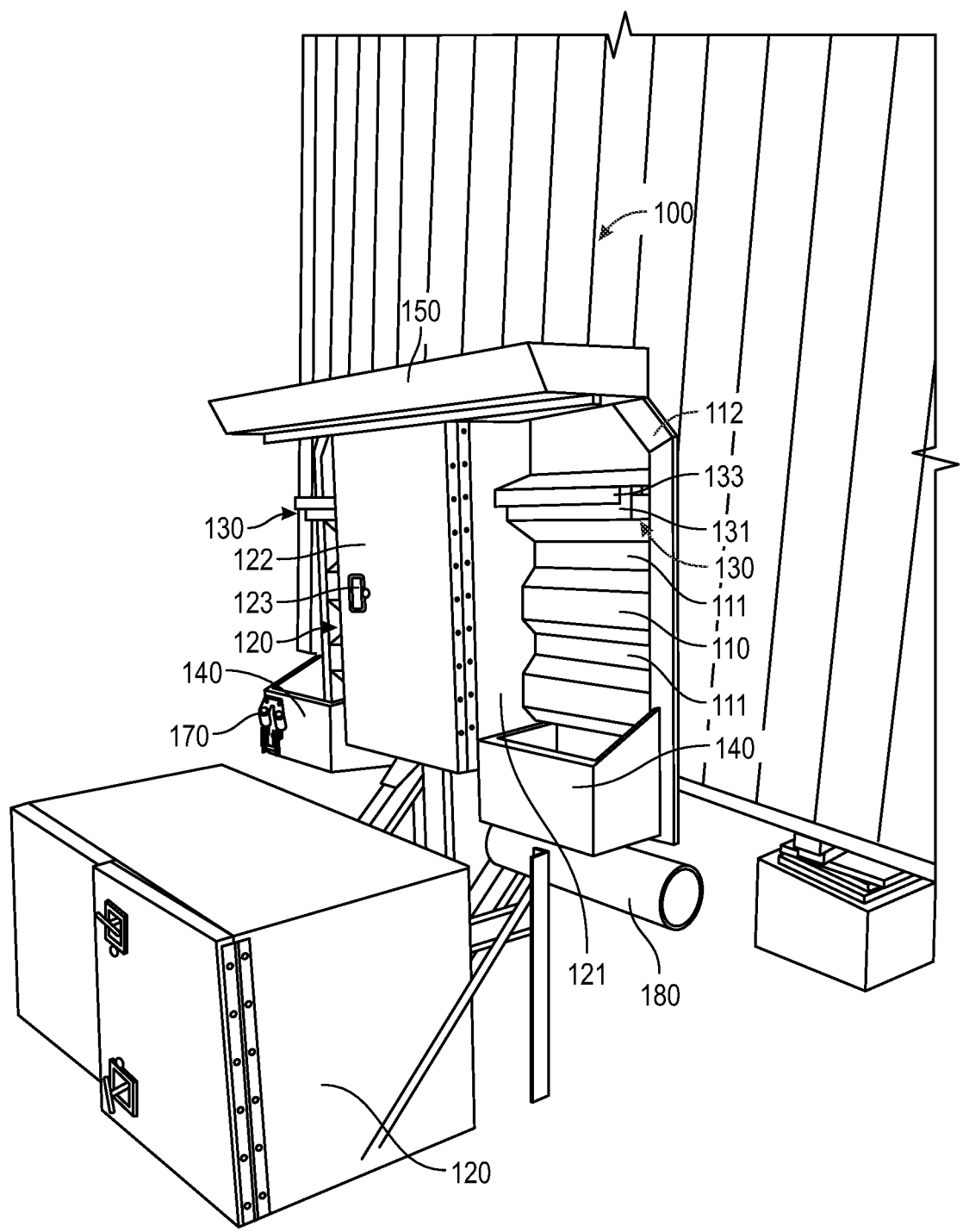
FIG. 1B illustrates a side perspective view of the storage assembly for the headache rack, according to an exemplary embodiment of the present general inventive concept.

FIG. 1B illustrates a side perspective view of the storage assembly 100 for the headache rack 110, according to an exemplary embodiment of the present general inventive concept.

Figure 1C:
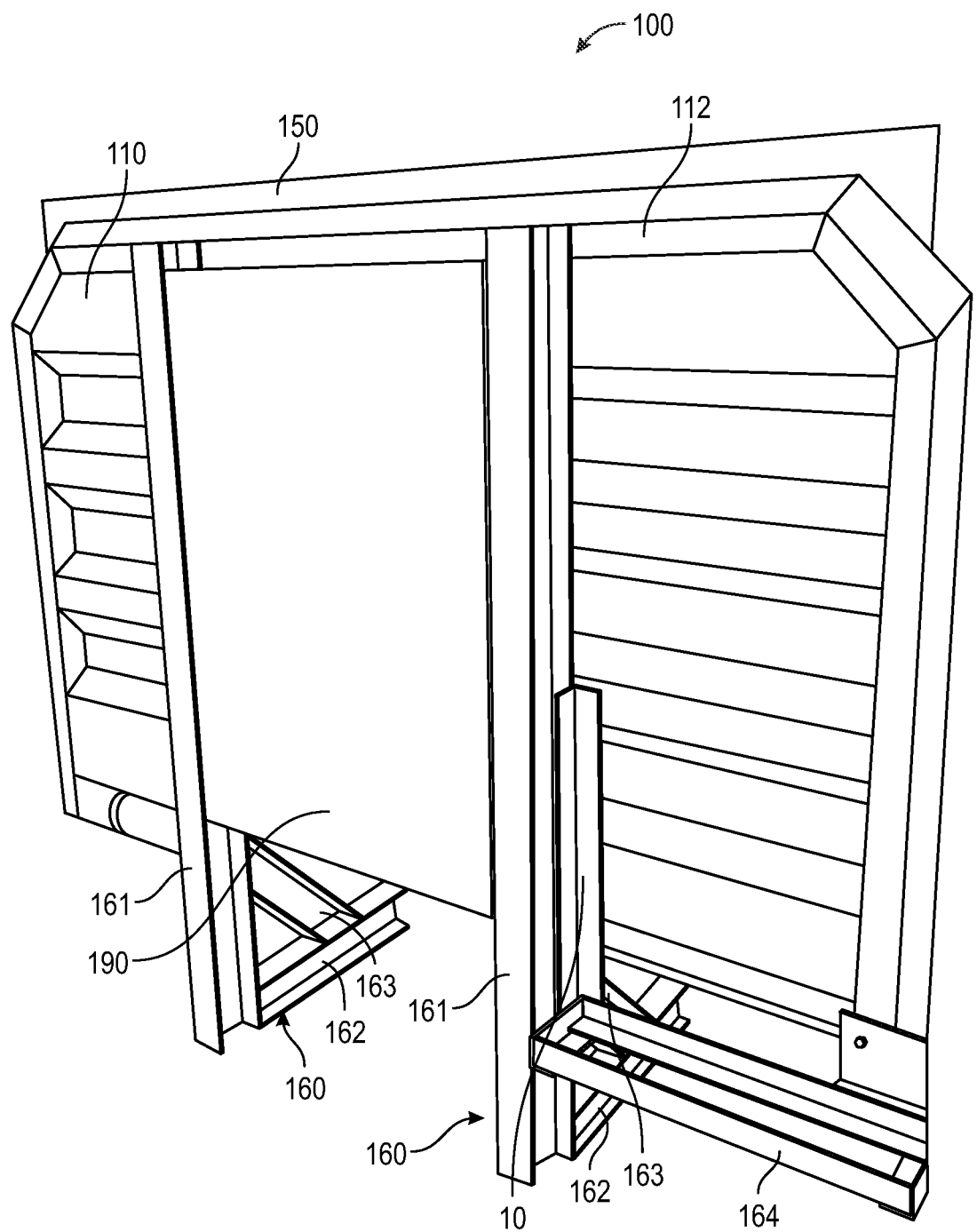
FIG. 1C illustrates a rear perspective view of the storage assembly for the headache rack, according to an exemplary embodiment of the present general inventive concept.

FIG. 1C illustrates a rear perspective view of the storage assembly 100 for the headache rack 110, according to an exemplary embodiment of the present general inventive concept.

Figure 1D:
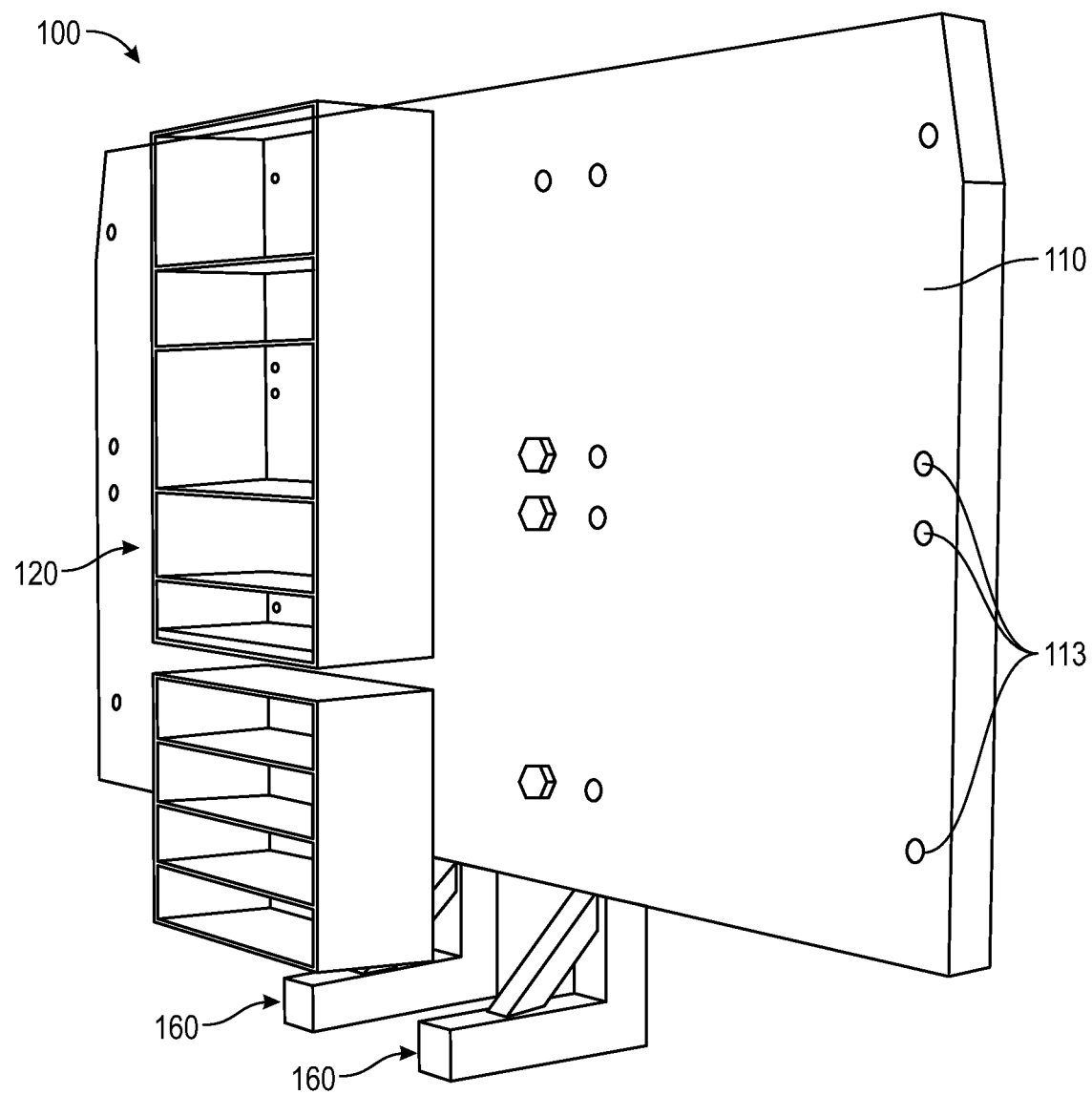
FIG. 1D illustrates a side perspective view of the storage assembly for the headache rack, according to an exemplary embodiment of the present general inventive concept.

FIG. 1D illustrates a side perspective view of the storage assembly 100 for the headache rack 110, according to an exemplary embodiment of the present general inventive concept.

The storage assembly 100 may be constructed from at least one of metal, plastic, wood, and rubber, etc., but is not limited thereto. For example, the storage assembly 100 may be constructed of aluminum.

The storage assembly 100 may include a headache rack 110, at least one storage container 120, a plurality of chain containers 130, a plurality of storage bins 140, a tarp holder 150, a plurality of mounting assemblies 160, a tool holder 170, a rod holder 180, and a support panel 190, but is not limited thereto.

Referring to FIGS. 1A through 1D, the headache rack 110 may include a plurality of recessed surfaces 111, an outer frame 112, and a plurality of mounting apertures 113, but is not limited thereto.

The headache rack 110 may be removably connected via at least one fastener 10 (e.g., screws, nails, bolts, nuts, washers) to a vehicle, such as a semi-trailer truck, a flat bed truck, a pick up truck, a car, a sport utility vehicle (SUV), and a van. In other words, the headache rack 110 may use the at least one fastener 10 (e.g., bolt) to be adjustable in size, which is not possible with welding. As such, the headache rack 110 may be stable from the at least one fastener 10 similar to welding, yet remains adjustable.

Referring to FIGS. 1A through 1C, the plurality of recessed surfaces 111 may be disposed on at least a portion of the headache rack 110. Moreover, the recessed surfaces 111 may be recessed with respect to an outer surface of a front portion of the headache rack 110 and protrude away from an outer surface of a rear portion of the headache rack 110.

The outer frame 112 may be disposed on at least a portion of a perimeter of the headache rack 110. As such, the outer frame 112 may prevent and/or absorb damage against the headache rack 110.

The plurality of mounting apertures 113 may be disposed on at least a portion of the headache rack 110. Additionally, the plurality of mounting apertures 113 may receive the at least one fastener 10 therein.

Figure 2:
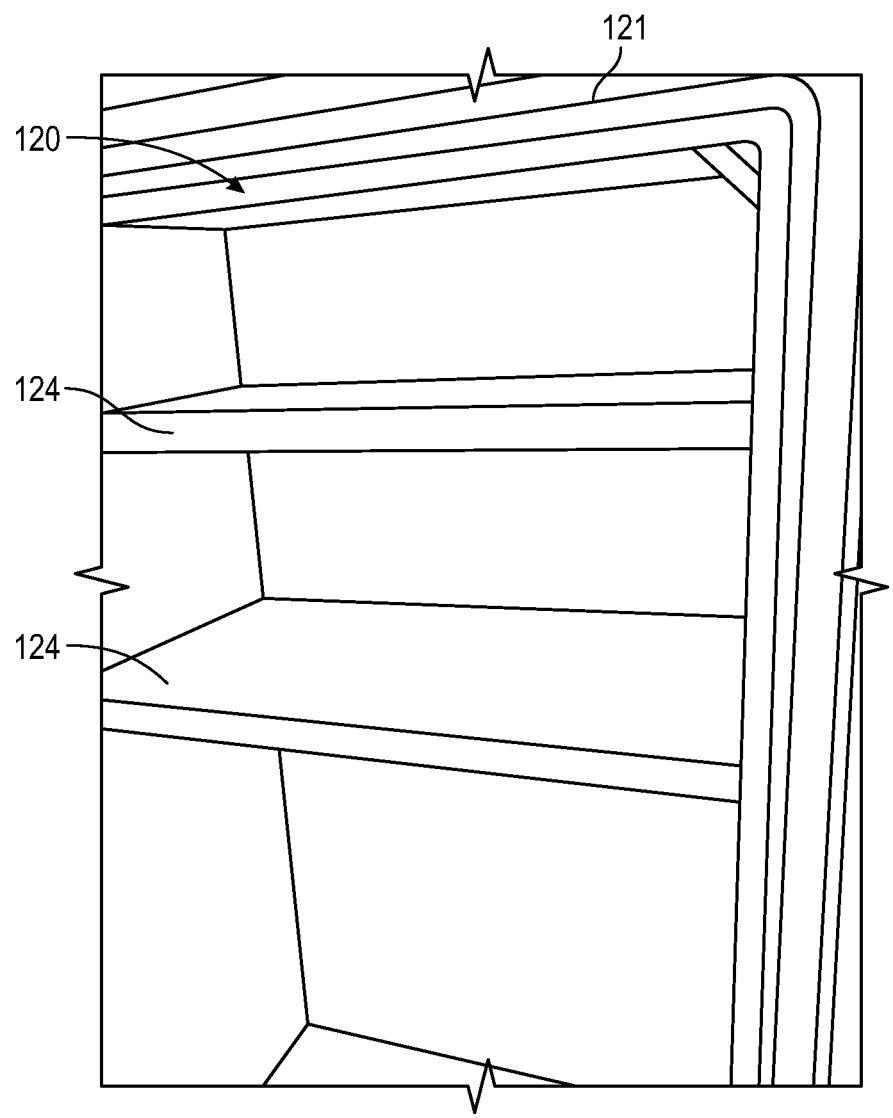
FIG. 2 illustrates a zoomed in view of an interior of a storage container, according to an exemplary embodiment of the present general inventive concept.

FIG. 2 illustrates a zoomed in view of an interior of a storage container 120, according to an exemplary embodiment of the present general inventive concept.

Referring to FIGS. 1A through 2, the at least one storage container 120 may include a container body 121, a container barrier 122, a latch 123, and a plurality of shelves 124, but is not limited thereto.

The container body 121 may be removably connected via the at least one fastener 10 to at least a portion of the headache rack 110. For example, the container body 121 may be removably connected to a center of the headache rack 110. Moreover, the container body 121 may have a length extending from a first end of the headache rack 110 to a second end of the headache rack 110.

The container barrier 122 may be movably (i.e. pivotally and/or rotatably) disposed on at least a portion of the container body 121 to cover an interior of the container body 121 while the container barrier 122 is closed. The container barrier 122 may move from closed in a first position to at least partially opened in a second position. Conversely, the container barrier 122 may move from opened in the second position to closed in the first position. As such, the container barrier 122 may prevent access within the container body 121 in the first position and allow access within the container body 121 in the second position.

The latch 123 may be disposed on at least a portion of the container barrier 122. Additionally, the latch 123 may lock the container barrier 122 in a first latch position and unlock the container barrier 122 in a second latch position.

The plurality of shelves 124 may be removably disposed within at least a portion of an interior of the container body 121. For example, the plurality of shelves 124 may be disposed on pegs within the container body 121 and/or tracks to slide within the container body 121. Also, the plurality of shelves 124 may be adjusted within the container body 121 to different positions therein. Moreover, the plurality of shelves 124 may receive at least one first item (e.g., tools) thereon.

Furthermore, the at least one storage container 120 may be exchanged for another at least one storage container 120 having a different size.

Each of the plurality of chain containers 130 may include a secondary body 131, a plurality of protrusions 132, and a cover 133, but is not limited thereto.

The secondary body 131 may be removably connected via the at least one fastener 10 to at least a portion of the headache rack 110. For example, the secondary body 131 may be removably connected to the headache rack 110 adjacent to a side of the at least one storage container 120. Referring to FIG. 1B, alternatively, the another at least one storage container 120 may be connected to another portion of the headache rack 110 adjacent to the at least one storage container 120, such that the at least one storage container 120 and/or the another at least one storage container 120 are side-by-side. In other words, the another at least one storage container 120 may replace a position of the secondary body 131.

The secondary body 131 may store at least one second item therein.

The plurality of protrusions 132 may be perpendicularly disposed away from the secondary body 131 with respect to a lateral direction. As such, the plurality of protrusions 132 may also be teeth. Also, the plurality of protrusions 132 may be rounded, pointed, serrated, smooth, and/or any combination thereof. The plurality of protrusions 132 may receive the at least one second item therebetween. For example, the plurality of protrusions 132 may receive a rope, a string, a wire, a strap, a chain, and/or any other type of elongate object therebetween. Therefore, the plurality of protrusions 132 may facilitate extraction of the at least one second item from the secondary body 131.

The cover 133 may be movably (i.e. pivotally and/or rotatably) disposed on at least a portion of the secondary body 131 to cover an interior of the secondary body 131 and/or the plurality of protrusions 132, such that the plurality of protrusions 132 may allow the at least one second item to move therebetween (i.e. be extracted) while the cover 133 is closed. The cover 133 may move from closed in a first position to at least partially opened in a second position. Conversely, the cover 133 may move from opened in the second position to closed in the first position. As such, the cover 133 may prevent access within the secondary body 131 in the first position and allow access within the secondary body 131 in the second position.

The plurality of storage bins 140 may be removably connected via the at least one fastener 10 to at least a portion of the headache rack 110. More specifically, a first of the plurality of the storage bins 140 may be removably connected to a first side of the at least one storage container 120 and a second of the plurality of storage bins 140 may be removably connected to a second side of the at least one storage container 120. However, the plurality of storage bins 140 may be connected to any portion of the headache rack 110. The plurality of storage bins 140 may store the at least one first item therein, the at least one second item, and/or at least one third item therein.

The tarp holder 150 may be removably connected via the at least one fastener 10 to at least a portion of a top portion of the headache rack 110. Additionally, the tarp holder 150 may store a tarp thereon.

Each of the plurality of mounting assemblies 160 may include a support beam 161, a mounting beam 162, a stabilizing beam 163, and an auxiliary beam 164, but is not limited thereto.

The support beam 161 may be constructed as an I-beam, a rectangular beam, and a circular beam, but is not limited thereto. However, an advantage of the !-beam is to allow additional objects to be disposed therebetween, which allows more space to be utilized.

The support beam 161 may be removably connected via the at least one fastener 10 to at least a portion of the rear portion of the headache rack 110. Additionally, the support beam 161 may have a length greater than a length of the headache rack 110. As such, the support beam 161 may extend below a bottom edge of the headache rack 110.

The mounting beam 162 may be constructed as an I-beam, a rectangular beam, and a circular beam, but is not limited thereto. However, an advantage of the !-beam is to allow additional objects to be disposed therebetween, which allows more space to be utilized.

The mounting beam 162 may be perpendicularly disposed away from the support beam 161 with respect to a first direction. Moreover, the mounting beam 162 may removably connect to at least a portion of the vehicle, such that the headache rack 110 may be disposed in a vertical position.

The stabilizing beam 163 may be constructed as an I-beam, a rectangular beam, and a circular beam, but is not limited thereto. However, an advantage of the !-beam is to allow additional objects to be disposed therebetween, which allows more space to be utilized.

The stabilizing beam 163 may be angularly disposed away from the mounting beam 162 toward the support beam 161 with respect to a second direction different from the first direction. As such, the stabilizing beam 163 may connect the mounting beam 162 to the support beam 161. Furthermore, the stabilizing beam 163 may prevent the support beam 161 and/or the headache rack 110 from moving (e.g., falling). In other words, the stabilizing beam 163 may stabilize the support beam 161 and/or the headache rack 110.

The auxiliary beam 164 may be perpendicularly disposed away from the support beam 161 with respect to a third direction different from the first direction and/or the second direction. Also, the auxiliary beam 164 may be removably connected via the at least one fastener 10 to the headache rack 110. Accordingly, the auxiliary beam 164 may support the support beam 161.

The tool holder 170 may be removably connected to at least a portion of the plurality of storage bins 140. The tool holder 170 may store the at least one first item, the at least one second item, the at least one third item, and/or at least one fourth item therein.

The rod holder 180 may be removably connected to at least a portion of the plurality of storage bins 140. The rod holder 180 may store the at least one first item, the at least one second item, the at least one third item, the at least one fourth, and/or at least one fifth item therein. For example, the rod holder 180 may store a rod therein.

The support panel 190 may be removably connected to at least a portion of the headache rack 110. More specifically, the support panel 190 may be removably connected between the plurality of mounting assemblies 160. As such, the support panel 190 may prevent movement of the plurality of mounting assemblies 160.

Therefore, the storage assembly 100 may provide the headache rack 110 a means of storage. Also, the storage assembly 100 may organize the at least one item.

The present general inventive concept may include a storage assembly 100, including a headache rack 110 to removably connect to a vehicle, at least one storage container 120 removably connected to at least a portion of the headache rack 110 to store at least one first item therein, and a plurality of mounting assemblies 160, each of the plurality of mounting assemblies 160 including a support beam 161 removably connected to at least a portion of a rear portion of the headache rack 110, a mounting beam 162 perpendicularly disposed away from the support beam 161 with respect to a first direction to connect to the vehicle, and a stabilizing beam 163 angularly disposed away from the mounting beam 162 toward the support beam 161 with respect to a second direction different from the first direction to prevent the support beam 161 and the headache rack 110 from moving.

The support beam 161 may extend below a bottom edge of the headache rack 110.

The storage assembly 100 may further include a plurality of chain containers 130, each of the plurality of chain containers 130 including a secondary body 131 removably connected to at least a portion of the headache rack 110 to store at least one second item therein, a plurality of protrusions 132 perpendicularly disposed away from the secondary body 131 with respect to a lateral direction to receive the at least one second item between the plurality of protrusions 132, and a cover 133 may be movably disposed on at least a portion of the secondary body 131 to cover an interior of the secondary body 131 and the plurality of protrusions 132, such that the plurality of protrusions 132 allow the at least one second item to move therebetween while the cover 133 is closed.

The storage assembly 100 may further include a plurality of storage bins 140 removably connected to at least a portion of the headache rack 110 to store at least one third item therein, such that a first of the plurality of the storage bins 140 is removably connected to a first side of the at least one storage container 120, and a second of the plurality of storage bins 140 is removably connected to a second side of the at least one storage container 120.

The storage assembly 100 may further include a tarp holder 150 removably connected to at least a portion of a top portion of the headache rack 110 to store a tarp thereon.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A storage assembly, comprising:
a headache rack to removably connect to a vehicle;
at least one storage container removably connected to at least a portion of the headache rack to store at least one first item therein;
a plurality of mounting assemblies, each of the plurality of mounting assemblies comprising:
a support beam removably connected to at least a portion of a rear portion of the headache rack,
a mounting beam perpendicularly disposed away from the support beam with respect to a first direction to connect to the vehicle, and
a stabilizing beam angularly disposed away from the mounting beam toward the support beam with respect to a second direction different from the first direction to prevent the support beam and the headache rack from moving; and
a plurality of storage bins removably connected to at least a portion of the headache rack to store at least one second item therein, such that a first of the plurality of the storage bins is removably connected to a first side of the at least one storage container, and a second of the plurality of storage bins is removably connected to a second side of the at least one storage container.

2. The storage assembly of claim 1, wherein the support beam extends below a bottom edge of the headache rack.

3. The storage assembly of claim 1, further comprising:
a plurality of chain containers, each of the plurality of chain containers comprising:
a secondary body removably connected to at least a portion of the headache rack to store at least one third item therein,
a plurality of protrusions perpendicularly disposed away from the secondary body with respect to a lateral direction to receive the at least one third item between the plurality of protrusions, and
a cover may be movably disposed on at least a portion of the secondary body to cover an interior of the secondary body and the plurality of protrusions, such that the plurality of protrusions allow the at least one second item to move therebetween while the cover is closed.

4. The storage assembly of claim 1, further comprising:
a tarp holder removably connected to at least a portion of a top portion of the headache rack to store a tarp thereon.

5. A storage assembly, comprising:
a headache rack to removably connect to a vehicle;
at least one storage container removably connected to at least a portion of the headache rack to store at least one first item therein;
a plurality of mounting assemblies, each of the plurality of mounting assemblies comprising:
a support beam removably connected to at least a portion of a rear portion of the headache rack,
a mounting beam perpendicularly disposed away from the support beam with respect to a first direction to connect to the vehicle, and
a stabilizing beam angularly disposed away from the mounting beam toward the support beam with respect to a second direction different from the first direction to prevent the support beam and the headache rack from moving; and
a plurality of chain containers, each of the plurality of chain containers comprising:
a secondary body removably connected to at least a portion of the headache rack to store at least one second item therein,
a plurality of protrusions perpendicularly disposed away from the secondary body with respect to a lateral direction to receive the at least one second item between the plurality of protrusions, and a cover may be movably disposed on at least a portion of the secondary body to cover an interior of the secondary body and the plurality of protrusions, such that the plurality of protrusions allow the at least one second item to move therebetween while the cover is closed.

\* \* \* \* \*